Nov. 10, 1959     F. R. SNYDER     2,912,554

ELECTRONIC OVEN SHELF ARRANGEMENT

Filed April 3, 1959

INVENTOR.
FRANK R. SNYDER
BY
HIS ATTORNEY

United States Patent Office 2,912,554
Patented Nov. 10, 1959

2,912,554
ELECTRONIC OVEN SHELF ARRANGEMENT

Frank R. Snyder, Owensboro, Ky., assignor to General Electric Company, a corporation of New York Application April 3, 1959, Serial No. 803,950

4 Claims. (Cl. 219—10.55)

This invention relates to electronic ovens, and more particularly to an improved shelf arrangement for such ovens.

Electronic ovens utlize high frequency electromagnetic wave energy to heat directly and internally foodstuffs placed therein, whereas conventional electric ovens utilize radiant energy and circulating heated air for heating the external surfaces of the food to be cooked. It has been demonstrated that electronic cooking is substantially faster than conventional electronic cooking in many cases, including in particular the cooking of roasts, turkeys and the like. A further advantage of electronic cooking is that only objects placed within the oven, and not the oven walls or air therein, are heated by the wave energy.

One of the problems presented by electronic ovens, and particularly those equipped with conventional electric heating units as well as a source of high frequency energy, concerns the shelves needed to support the food to be cooked. Because metal objects may absorb a substantial amount of the wave energy supplied to the oven and also may distort the electric and magnetic field patterns so as to cause uneven cooking, shelves made of non-metallic materials have been used in some electronic ovens. However, these shelves are more costly than metal shelves (such as the wire racks used in the conventional ovens, for example) and have proved to be quite unsatisfactory in combination electronic-electric ovens because of their poor heat resistance.

Accordingly, the general object of the present invention is to provide a metal shelf for electronic ovens so constructed that it does not absorb any appreciable quantity of the high frequency energy supplied to the oven, and does not cause any detrimental distortion of the wave pattern in the oven.

Further objects and advantages of the invention will become apparent as the following description proceeds, and the features of novelty which characterize the invention will be pointed out with particularity in the claims appended to and forming a part of this specification.

For a better understanding of the invention, reference may be made to the following description and the accompanying drawing in which.

Figure 1:
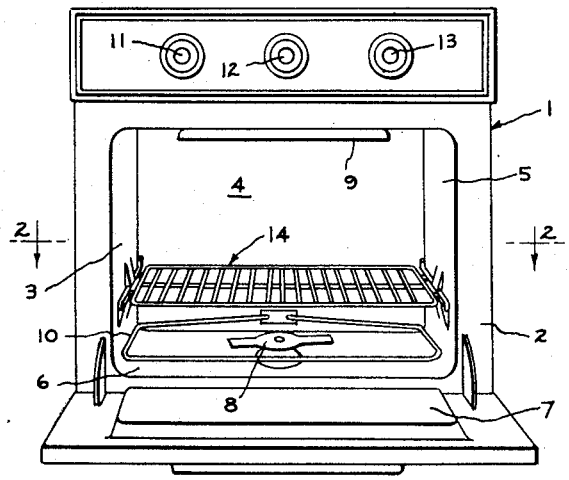
Fig. 1 is a front elevation view of an electronic oven embodying the present invention.

Referring to Fig. 1 of the drawing, the numeral 1 generally designates an electronic oven having a front panel 2 and generally rectangular metal walls forming an oven compartment including a top wall (not shown), side walls 3, 4, and 5, and a bottom wall 6. A door 7 is arranged to close the open front of the oven and compartment, being hinged along its bottom edge so that it may be pivoted from the open position shown in Fig. 1 to an upright closed position.

Disposed adjacent the bottom wall 6 of the oven compartment is an antenna 8 arranged to supply high frequency electromagnetic wave energy to the oven compartment. Antenna 8 is of course supplied with high frequency energy from a suitable source such as a magnetron tube (not shown). Oven 1 may also be equipped with conventional heating means such as an electric broiling element 9 mounted adjacent the top wall of the oven and a sheathed electric heating unit 10 mounted adjacent the bottom of the oven so as to provide heat during baking operations. Suitable manual controls, generally indicated by the numerals 11, 12 and 13, are provided to control and regulate the supply of high frequency energy to the oven and the energization of heating units 9 and 10.

Electronic ovens of the type thus far described where well known in the art prior to the present invention, which will now be described in detail. In order to provide necessary support for foods to be cooked in the oven, I have provided a metal shelf generally designated by the numeral 14 arranged to cooperate with shelf support members 15, 16 and 17 formed by embossing, for example, on side wall 3, and similar shelf support members on side wall 5. In the presently preferred form of the invention shelf 14 is of the wire rack type but it is to be understood that other types of metal shelves may be utilized if desired. Shelf 14 includes a peripheral support wire member 15, a cross piece 16, and a plurality of wire members mounted in parallel relation to each other but perpendicular to cross piece 16. Wire elements 15, 16 and 17 are of course welded together at their various intersections so as to provide a rigid structure. It will be observed that the general configuration of shelf 14 is similar to the configuration of bottom wall 6, but that shelf 14 is somewhat smaller so as to provide air gaps between the edges of the shelf and the side walls adjacent thereto. It is necessary that there be no electrical contacts between the edges of the shelf and the adjacent side walls and also that these parts be spaced as described so as to avoid detrimental distortion of the electromagnetic field patterns in the oven.

In accordance with the present invention shelf 14 is provided with laterally spaced elements 18 and 19 on each of the two side edges thereof and arranged to rest in engagement with support members 15, 16 and 17. It has been found that heating of shelf 14 is minimized by mounting support elements 18 and 19 in spaced relation with respect to the adjacent edges of shelf 14 and connecting these support elements to the shelf at spaced locations coinciding with the points of minimum induced voltage as measured between the side edges of the shelf and the side walls of the oven. It has also been found that these points of minimum induced voltage may be located with respect to the edges of the shelf in terms of the wavelength of the wave energy supplied to the oven. More specifically, in an oven having a shelf which is substantially 1 3/10 of the aforesaid wave length, measured from front to rear, it is important that one of the connections between the rack and the support elements be substantially 3/10 of the wave length from the front edge of the shelf and the location of another connection be substantially 7/10 of the wave length from the front edge.

Figure 2:
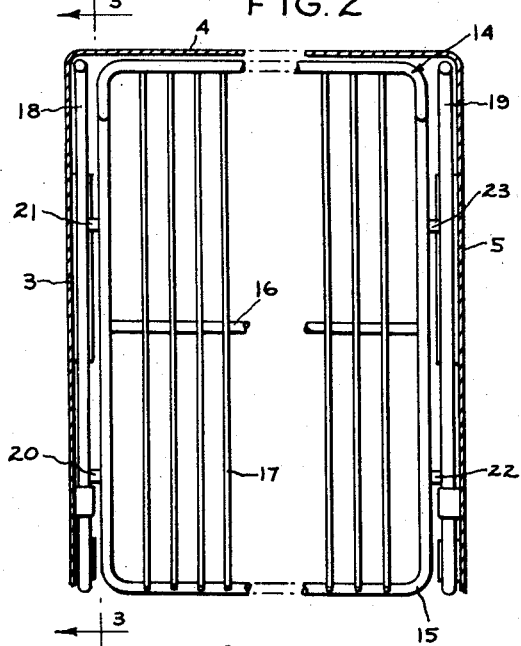
Fig. 2 is a fragmentary cross-sectional view taken along the line 2—2 in Fig. 1.
Figure 4:
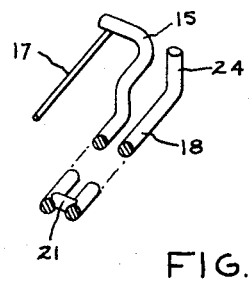
Fig. 4 is a fragmentary perspective view of the left rear corner of the shelf shown in Fig. 2.
Figure 5:
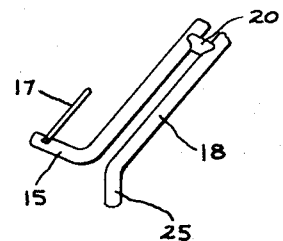
Fig. 5 is similar to Fig. 4 but shows the left front portion of the shelf.
Figure 3:
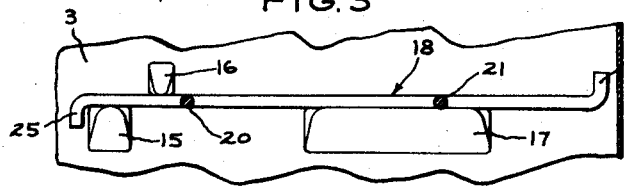
Fig. 3 is a fragmentary cross-sectional view taken along the line 3—3 in Fig. 2.

Thus, as shown in Fig. 2, support element 18 is connected to shelf 14 by a pair of connecting links 20 and 21 which are welded to the support and the shelf, or otherwise made an integral part thereof. Similarly, support element 19 is connected to shelf 14 by connecting links 22 and 23. As shown in Figs. 3, 4 and 5, it is desirable that support element 18 have an upturned rear portion 24 so as to perform the function of a stop when the rack is withdrawn from the oven (portion 23 then engages support member 16, of course). Also, in order to prevent shelf 14 from touching the rear wall 4 of the oven a downturned front portion 25 on support element 18 is provided so as to engage support member 15 when the shelf is in the position shown in Fig. 3.

All of the reasons underlying the superior performance of the present invention are not fully understood, because the precise nature of wave energy phenomena within an electronic oven is not completely understood. Nevertheless, shelves constructed and arranged in accordance with the present invention have proved to be highly useful and from the foregoing description it will be evident that at least the general object of the invention has been attained.

While I have shown and described a particular embodiment of my invention, I do not desire the invention to be limited to the particular construction disclosed, and I intend by the appended claims to cover all the modifications within the true spirit and scope of my invention.

What I claim is:

1. An electronic oven comprising metal top, bottom and side walls of generally rectangular shape forming an open front oven compartment, a door closing said open front, means for introducing electromagnetic wave energy into said compartment, said side walls having shelf support members thereon, a horizontally disposed metal shelf in said compartment, said shelf having a rectangular configuration generally similar to said bottom wall but smaller so that the side edges thereof are spaced from said side walls and said door, said shelf including laterally spaced support elements on each of the side edges thereof arranged to rest on said support members, said support elements being connected to said shelf at spaced locations coinciding with the points of minimum induced voltage as measured between the side edges of said shelf and said side walls.

2. An electronic oven as defined in claim 1 in which said support elements are elongated rods disposed in parallel relation to said side walls whereby said shelf is capable of sliding movement into and out of said oven compartment.

3. An electronic oven comprising metal top, bottom and side walls of generally rectangular shape forming an open front oven compartment, a door closing said open front, means for introducing electromagnetic wave energy of a predetermined wave length into said compartment, said side walls having shelf support members thereon, a horizontally disposed metal shelf in said compartment, said shelf having a rectangular configuration generally similar to said bottom wall but smaller so that the side edges thereof are spaced from said side walls and said door, said shelf including laterally spaced support elements on each of the side edges thereof arranged to rest on said support members, each of said support elements being connected to the adjacent side edge of said shelf at two spaced locations, the length of said side edges being substantially one and three tenths of said wave length, one of said locations being substantially three-tenths of said wave length from the front edge of said shelf and the other of said locations being substantially seven-tenths of said wave length from said front edge.

4. An electronic oven as defined in claim 3 in which said support elements are elongated rods disposed in parallel relation to said side walls whereby said shelf is capable of sliding movement into and out of said oven compartment.

References Cited in the file of this patent

UNITED STATES PATENTS 2,782,292    Long  ---------------- Feb. 19, 1957